June 18, 1946. H. KEARNS 2,402,287
PLASTIC RIVET
Filed Sept. 27, 1943
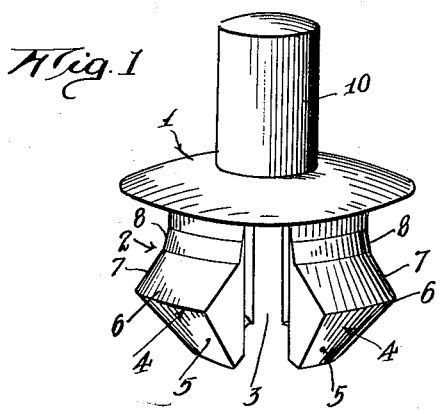
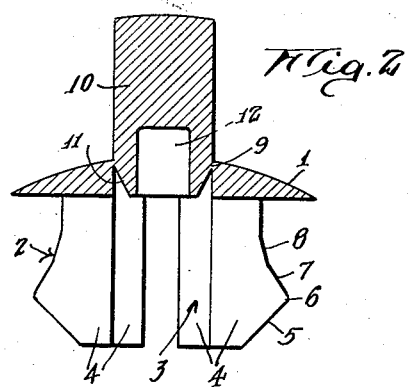
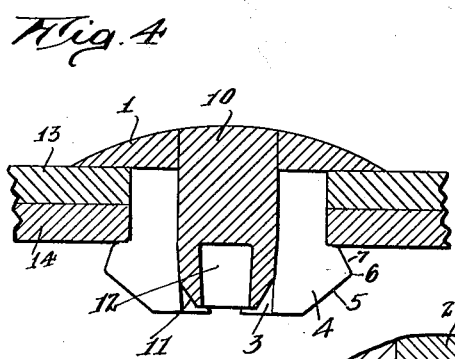
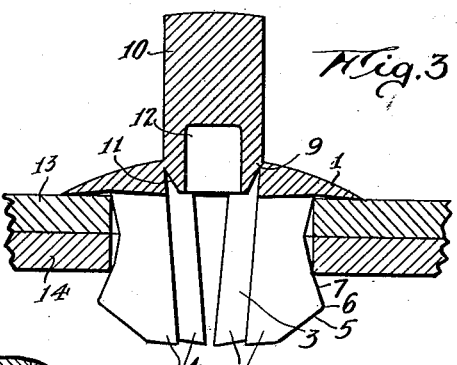
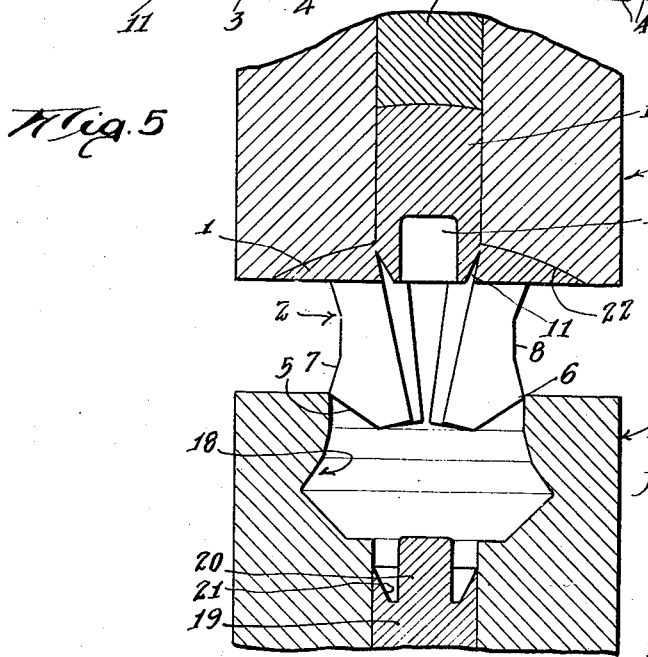
Inventor
Henry Kearns
By Lyon & Lyon
Attorneys Patented June 18, 1946

2,402,287

UNITED STATES PATENT OFFICE 2,402,287

PLASTIC RIVET

Henry Kearns, Pasadena, Calif., assignor, by mesne assignments, to Shellmar Products Corporation, Mount Vernon, Ohio, a corporation of Delaware Application September 27, 1943, Serial No. 504,018

12 Claims. (Cl. 85—40)

The object of the present invention is to provide a rivet, which is produced and made of plastic material and is adapted for uniting either sheets of metal or sheets of plastic materials.

The rivet of the present invention is intended to be used as a so-called blind rivet, that is, it is to be installed from a single side of the plates of metal which are to be united. A further feature of the rivet of the present invention resides in the fact that the entire rivet is made in one piece and remains as a single piece previous to the act of installing the rivet in place.

The rivet of the present invention includes a head having a hollow pin extending from the head, which hollow pin is split to form a plurality of retaining tongues, the free ends of which are radially inwardly movable in the act of installing the rivet and expandible to a holding position. These tongues are provided on their exterior with suitable bevelled faces adapted for wedging tightly together the plates of material which are to be secured by the rivet. There is also connected to the head a cylindrical plunger which is normally attached to the head as an integral part, but which in the riveting operation is capable of being sheared from the head, after which the plunger may be forced through the hollow pin connected to the head for locking the retaining tongues in the riveting position.

The rivet of the present invention has the advantage that it is deliverable as a single piece to the riveter and is capable of being used as a blind rivet so as to unite two sheets of material together in an exceptionally firm and solid manner.

The present invention also includes a novel method of producing the rivet in a molding operation between two dies, each of which is provided with a central plunger movable relative to the remainder of the die, one of the central plungers being employed for moving the material which is intended to form the plunger of the rivet from the body of the material undergoing the molding operation so as to simultaneously form the plunger of the rivet and the desired bore of the rivet, the other plunger being movable at the conclusion of the molding operations for ejecting the produced rivet from the dies.

Various additional important features of the present invention will be apparent from the following description of the preferred form or forms of rivets and process of producing the same hereinafter described in connection with the accompanying drawing.

In the drawing:

Figure 1 is a perspective view of the finished rivet.

Figure 2 is a longitudinal section.

Figure 3 is a similar section showing the rivet inserted between two sheets in riveting operations, but previous to the shearing of the locking plunger.

Figure 4 is a similar view showing the shearing of the locking plunger from the head and the operation of driving the locking plunger into position to lock the rivet.

Figure 5 is a section through the dies employed in the rivet-forming process showing a produced rivet in position occupied by the rivet when the dies are separated previous to ejecting the rivet from the dies.

Referring to the drawing, the rivet is shown as comprising a head 1, which in the particular example illustrated is indicated as having a flat underside and curved top, although a square head or a head adapted for countersinking may be employed, if desired. From the head 1 extends a split pin 2 which has a central bore 3. There is thus provided a plurality of movable retaining tongues 4 for the rivet. These retaining tongues are capable of flexing inward in the act of inserting the rivet in riveting operations and again expanding to the holding position. For facilitating the inward flexing of the tongues 4 they are provided at their lower end with tapered surfaces 5, and the lower end of the tongue is enlarged to provide retaining heads 6 on the tongues, the upper surfaces of which heads taper inwardly, as indicated at 7. Above the tapered surfaces 7 the tongues may be provided with further tapered surface 8, which surfaces, however, are more nearly parallel to the axis of the rivet.

Joined to the head of the rivet integrally, as indicated at 9, is a locking plunger 10. The juncture between the locking plunger 10 and the head 1 of the rivet is over a restricted area, so that this juncture will form a suitable shear point to enable the plunger to be sheared from the head and driven into the bore of the pin 2 in riveting operations. The diameter of the plunger 10 is made to have a very close fit with the diameter of the bore 3, providing a forced fit between the plunger 10 and bore 3 of the rivet in the riveting position.

I have also indicated a tapered undercut 11 on the lower end of the plunger and a recess 12 in the lower end of the plunger for facilitating the shearing of the plunger from the head and its entrance into the body of the rivet.

Now, referring more particularly to Figures 3 and 4, I have illustrated the manner of use of the rivet for the purpose of riveting together sheets, such as the sheets 13 and 14. The rivet is intended for riveting together sheets produced of any desired material. When, however, the sheets 13 and 14 are formed of plastic material, it is possible to unite the rivet (which is also formed of plastic material) and the sheets together as a solid mass. This is accomplished by coating the rivet with a suitable solvent for the plastic just before the riveting operation, such for example as acetone.

In installing the rivet in place, the rivet is first pressed into the opening between the plates 13 and 14 in such a manner as to engage the tapers 5 with the edges of the opening, and flex the tongues 4 inwardly to permit the passage of the pin 2 of the rivet. This operation positions the rivet relative to the plates 13 and 14, as indicated in Figure 3, where a portion of the plates still engages the tapered surfaces 7 of the tongues. Pressure is then imposed upon the plunger 10 suitable for shearing the plunger from the head 1 of the rivet, and the plunger 10 is then driven into the bore of the body of the rivet into the position shown in Figure 4. The sheets are thereby locked firmly into position.

Now, referring more particularly to Figure 5, I have indicated suitable molding apparatus for use in producing the rivets of the present invention. The rivet of the present invention may be formed by the use of a large variety of the modern plastic compositions, and for its production an upper die 16 and a lower die 17 are employed. The lower die 17 is shaped to fit the exterior of the tongues of the intended rivet, as indicated at 18, and is provided with a central bore in which is mounted a plunger 19, the diameter of which is identical with the intended bore 3 of the rivet to be produced. This plunger 19 is provided with a pin 20 suitable for producing the enclosed recess 12 in the plunger of the rivet and with tapered groove 21 for forming the taper of the plunger of the rivet. The upper die 16 is indicated at 22 as shaped to form the head of the intended rivet and is provided with a central bore mounting a plunger 23. In the operation of molding the plastic rivet the two dies 16 and 17 are brought together with their plungers 19 and 23 in position to allow for the proper formation of the rivet. The plastic composition is introduced between the two dies and allowed to set. The plunger 19 is then retracted from the bore of the produced rivet in order to allow the tongues produced on the rivet to flex inwardly in the operation of removing the rivet from the die. The two dies are then separated in the manner indicated in Figure 5, the tongues bending inwardly in order to allow the rivet to be pulled out from the undercut surfaces of the die. After separation of the dies 16 and 17, the plunger 23 is then actuated for the purpose of expelling the rivet from the die 16.

While the particular rivet and process of producing the same herein described is well adapted to carry out the objects of the present invention, it is to be understood that various modifications may be made, and the present invention is of the scope set forth in the following claims.

I claim:

1. A plastic rivet, comprising a body including a head and a hollow pin extending from the head, said pin being slit to provide a plurality of retaining tongues the free ends of which are capable of flexing in rivet installing operations, and a plunger initially joined integrally to the head along a shear area, said plunger adapted to be sheared from said head by axially applied force and movable by such force into close fit with the bore of said pin.

2. A plastic rivet, comprising a body including a head having a plurality of circumferentially spaced retaining tongues the free ends of which tongues are capable of flexing radially inwardly in riveting operations, and a plunger initially joined integrally to the head and adapted to be sheared from the head by axially applied force and moved by such force centrally between the tongues for retaining the same in outward positions.

3. A plastic rivet, comprising a body having a head with a plurality of flexible tongues extending therefrom and defining a central bore for the rivet, said tongues having retaining portions having downwardly tapering surfaces at their lower sides and upwardly tapering surfaces at their upper sides, and a plunger initially connected to said body along a shear area and movable in response to axial force thereon sufficient to shear its connection with said body into close fit with the bore defined by said tongues.

4. A securing device comprising a hollow body of deformable plastic material having a head portion and a stem portion extending therefrom, said stem portion being provided with a plurality of spaced retaining tongues, the free ends of which are capable of flexing radially inwardly, and a plunger initially joined to said body by an integral shearable connection, said plunger adapted to be sheared from and driven into said hollow body by an axially applied force.

5. A securing device comprising a body member of deformable plastic material having a central bore, a head on one end of said body member and a plurality of flexible securing tongues on the other end of said body member, said tongues being provided with outer surfaces which form an annular shoulder tapering inwardly toward the head on said body member, and a plunger aligned with said central bore in said body member and having an initially integral shearable connection with said body member whereby an axial driving force applied thereto will shear said plunger from said body and move it into spreading engagement with the inner surfaces of said securing tongues.

6. In a device adapted to be secured in an apertured member, a body member of deformable plastic material having a head and an axially split hollow stem providing a plurality of radially flexible fingers adapted to be contracted for insertion in the aperture in said member, an annular enlargement on the outer surfaces of said fingers beveled toward said head, and a pin initially closing said hollow stem and having integral connection therewith, said integral connection being sufficiently weak so that it will break when an axial force is applied to drive said pin into said hollow stem whereby said enlargement will be radially expanded into deformed gripping relation with the walls of said apertured member.

7. A securing device comprising a body member of deformable material having a head and a hollow stem, said stem having an axially split beveled enlargement adapted to be radially compressed to pass through an opening of a size to fit said stem and adapted when engaged with the margins of said opening by radially outward movement to exert a component load in tension on said stem, and a pin initially closing said stem and joined thereto by a weak connection which will readily shear when a force is applied to said pin to move it into said stem and thereby force said enlargement radially outward into deformed engagement with the margins of said opening.

8. An initially single piece blind rivet adapted to secure members of different total thickness, comprising a body member of deformable material having a head and a tubular stem extending therefrom, said stem being split axially into segments, the outer walls of said segments diverging throughout the greater part of the axially split portion of said stem but converging at their extremities to form compositely a second head for said body member, said segments adapted to constrict radially to enter an opening in the members to be secured, the diverging portions of said segments adapted to engage the exit margins of such opening, and an initially integral pin joined to said head by a weak connection, said pin adapted to be forced into the bore of said stem to radially expand said segments and deform said diverging portions into conformity with said exit margins.

9. An initially single piece securing device comprising a head, a plurality of retaining tongues extending in one direction therefrom and defining a pin receiving bore, and a pin initially joined to said head by a weak integral connection and extending therefrom in the opposite direction to said tongues, said pin adapted to be severed from said head and forced in said bore to spread said tongues radially.

10. In an initially single piece securing device, a pair of telescopical plastic members in initially aligned relation, an integral shearable connection joining said members adapted to be sheared by an axial driving force.

11. In an initially single piece securing device, a pair of telescopical plastic members in initially aligned partially telescoped relation, an integral shearable connection joining said members, said connection adapted to be sheared by an axial driving force tending to further telescope said members.

12. In an initially single piece securing device comprising molded telescopical plastic members initially arranged in aligned partially telescoping relation, an integral annular shearable connection joining said members, said connection adapted to be sheared by an axial driving force adapted to further telescope said members.

HENRY KEARNS.